(12) United States Patent
Giacobino

(10) Patent No.: US 8,337,077 B2
(45) Date of Patent: Dec. 25, 2012

(54) UNIDIRECTIONAL COUPLING-CLUTCH RUNNER

(75) Inventor: Julien Giacobino, Gland (CH)

(73) Assignee: Patek Philippe SA Geneve, Geneva (CH)

( * ) Notice: Subject to any disclaimer, the term of this patent is extended or adjusted under 35 U.S.C. 154(b) by 213 days.

(21) Appl. No.: 13/009,133

(22) Filed: Jan. 19, 2011

(65) Prior Publication Data

US 2011/0299366 A1 Dec. 8, 2011

(30) Foreign Application Priority Data

Jun. 3, 2010 (CH) .................................. 00887/10

(51) Int. Cl.
G04B 3/00 (2006.01)
G04B 23/00 (2006.01)
(52) U.S. Cl. ........................................ 368/206; 368/147
(58) Field of Classification Search .......... 368/145–147, 368/185, 190, 191, 206–209, 216, 308, 319, 368/320; 192/55.1, 55.2, 56.1
See application file for complete search history.

(56) References Cited

U.S. PATENT DOCUMENTS

| 2,563,112 | A | * | 8/1951 | Hill et al. ........................ 368/209 |
| 2,739,682 | A | * | 3/1956 | Detwiler ........................... 192/46 |
| 3,486,597 | A | * | 12/1969 | Carlton ............................ 192/46 |
| 3,589,486 | A | * | 6/1971 | Kelch .............................. 192/46 |
| 3,667,307 | A | | 6/1972 | Kelch |
| 6,234,904 | B1 | * | 5/2001 | Kawaguchi et al. ............ 464/30 |
| 7,384,190 | B2 | | 6/2008 | Zimmermann |
| 2007/0237035 | A1 | * | 10/2007 | Helfer et al. ................... 368/147 |

FOREIGN PATENT DOCUMENTS

| EP | 1429213 | A2 | 6/2004 |
| EP | 1586960 | A1 | 10/2005 |

OTHER PUBLICATIONS

Reymondin, C. et al: "Theory of Horology", Apr. 1989, p. 180, Swiss Federation of Technical Colleges (FET), Switzerland.

* cited by examiner

Primary Examiner — Vit W Miska
(74) Attorney, Agent, or Firm — Young & Thompson

(57) ABSTRACT

A unidirectional coupling-clutch runner includes a coaxial pinion and wheel which pivot relative to one another. The runner includes a first driving part angularly integral with the pinion having at least one elastic catch with the general shape, in plan view, of a C, one branch of which is elongated and terminates with a free end; and a second driving part angularly integral with the wheel and which is coplanar with the first driving part having an internal wolf-toothing. In the neutral rest position the first and second driving parts do not touch one another, the end of the elastic catches in the rest position which are not elastically deformed being located on a circumference whose diameter is larger than a circumference which goes through the top of the wolf-teeth and smaller than a circumference going through the bottom of the toothing of the second driving part.

15 Claims, 8 Drawing Sheets

UNIDIRECTIONAL COUPLING-CLUTCH RUNNER

This invention relates to unidirectional coupling-clutch systems designed especially for a horological application such as a manual and automatic winding mechanism of a watchmaking component. In the following the term "runner" is used to mean a mobile formed of a wheel and its pinion.

There are various types of unidirectional coupling-clutch runners such as those used in the automatic winding gear train of a watch which are coupling-clutch runners with vertical catches, rollers or a disengagement spring. Such unidirectional coupling-clutch runners are described for example in the publication "Theory of Horology" page 180, Edition de la Federation des Ecoles Techniques (FET), Switzerland, 1998.

The major defect of these coupling-clutch runners is their overall height which is at least 0.7 mm, more generally greater than 1 mm.

Moreover these clutch-release runners allow transmission of torques of roughly 200 gr. mm which is insufficient for many applications.

Furthermore, document EP 1 586 960 discloses a crown for a watch component with a disengagement device which is designed to disengage the winding crown from the winding stem as soon as the transmitted torque exceeds a preset value to prevent damage to the barrel. Such a device is not a unidirectional coupling-clutch device, but in fact a torque limiter.

The purpose of this invention is to produce a unidirectional coupling-clutch runner which has an increased ratio of the transmitted torque/disengagement torque, whose overall height is less than 0.5 mm and which can transmit a useful torque of 500 to 2000 gr. mm.

The object of this invention is a unidirectional coupling-clutch runner especially for a horological application and more particularly designed to be part of the gear train of an automatic and/or manual winding mechanism of a watch component or of a watch movement which eliminates said drawbacks.

This unidirectional coupling-clutch runner is distinguished by a coaxial pinion and wheel which pivot relative to one another, characterized by the fact that it comprises a first driving part that is angularly integral with the pinion comprising at least one elastic catch with the general shape, in plan view, of a C, one branch of which is elongated and terminates with a free end; that it also comprises a second driving part that is angularly integral with the wheel and that is coplanar with the first driving part comprising an internal wolf-toothing; and by the fact that in the neutral rest position the first and second driving parts do not touch one another, the end of the elastic catches in the rest position which are not elastically deformed being located on a circumference whose diameter is larger than a circumference that goes through the top of the wolf-teeth and smaller than a circumference that goes through the bottom of the teeth of the toothing of the second driving part.

This invention also has as its object a winding mechanism of a watch piece comprising such a unidirectional coupling-clutch runner as well as a watch piece comprising one or more of these unidirectional coupling-clutch runners.

The attached drawing schematically shows by way of example an embodiment of the unidirectional coupling-clutch runner as well as a winding mechanism of a watch piece provided with such unidirectional coupling-clutch runners.

Figure 1:
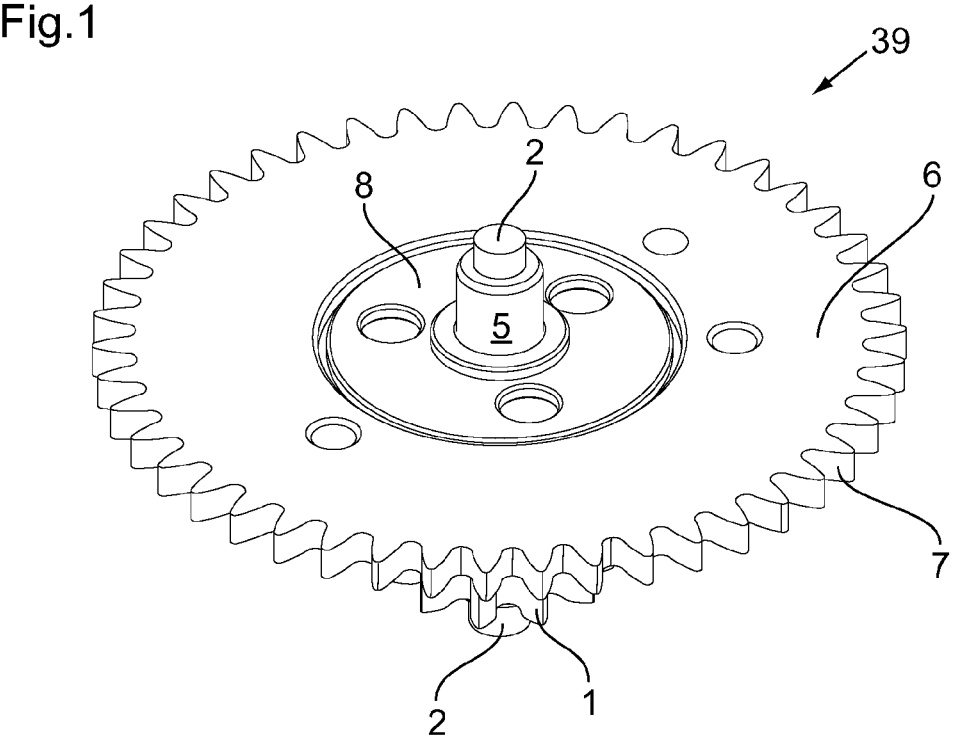
FIG. 1 is a perspective bottom view of the unidirectional coupling-clutch runner.
Figure 2:
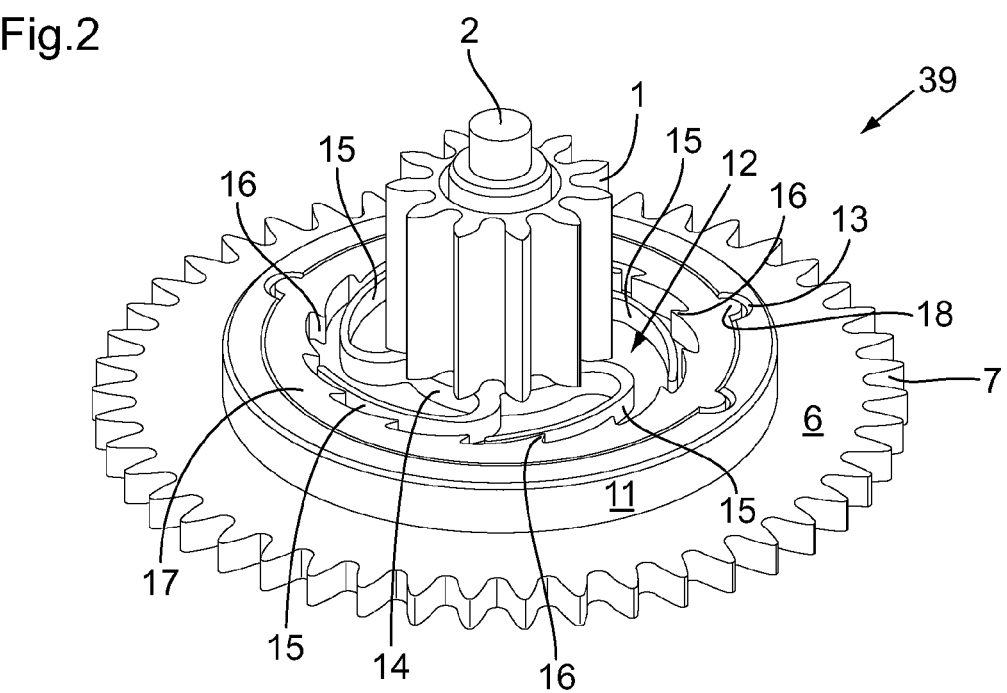
FIG. 2 is a perspective top view.
Figure 3:
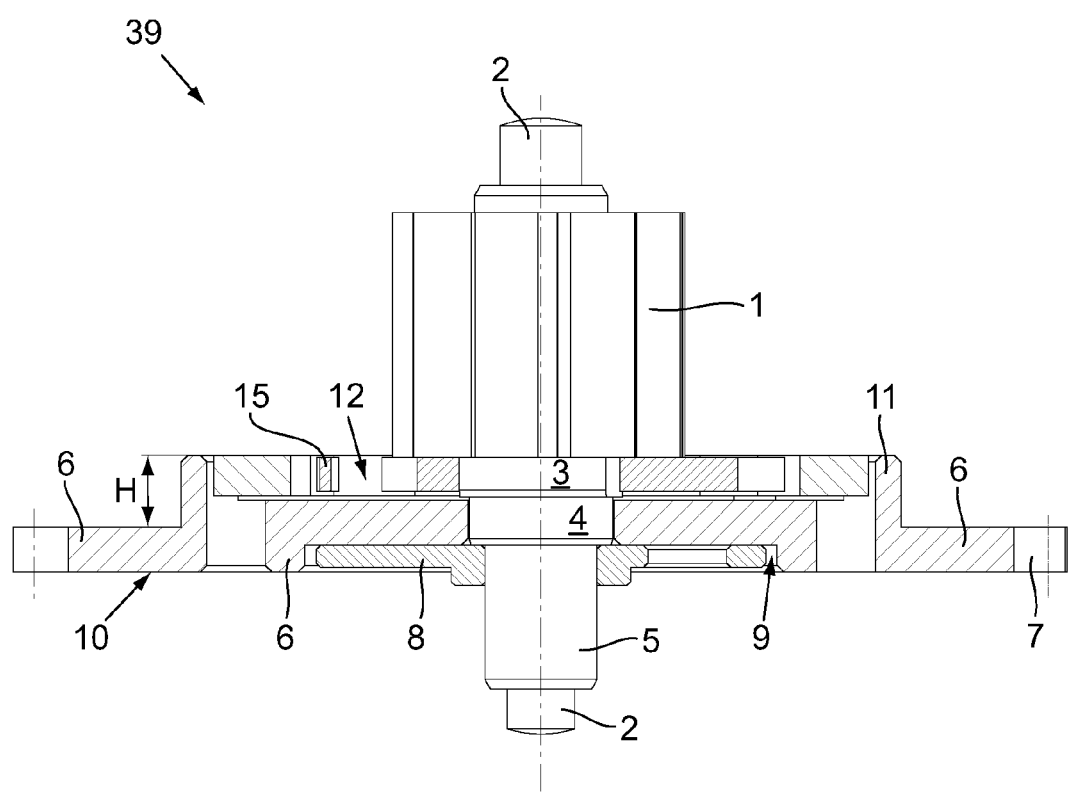
FIG. 3 is a diametral view in section of the unidirectional coupling-clutch runner.
Figure 4:
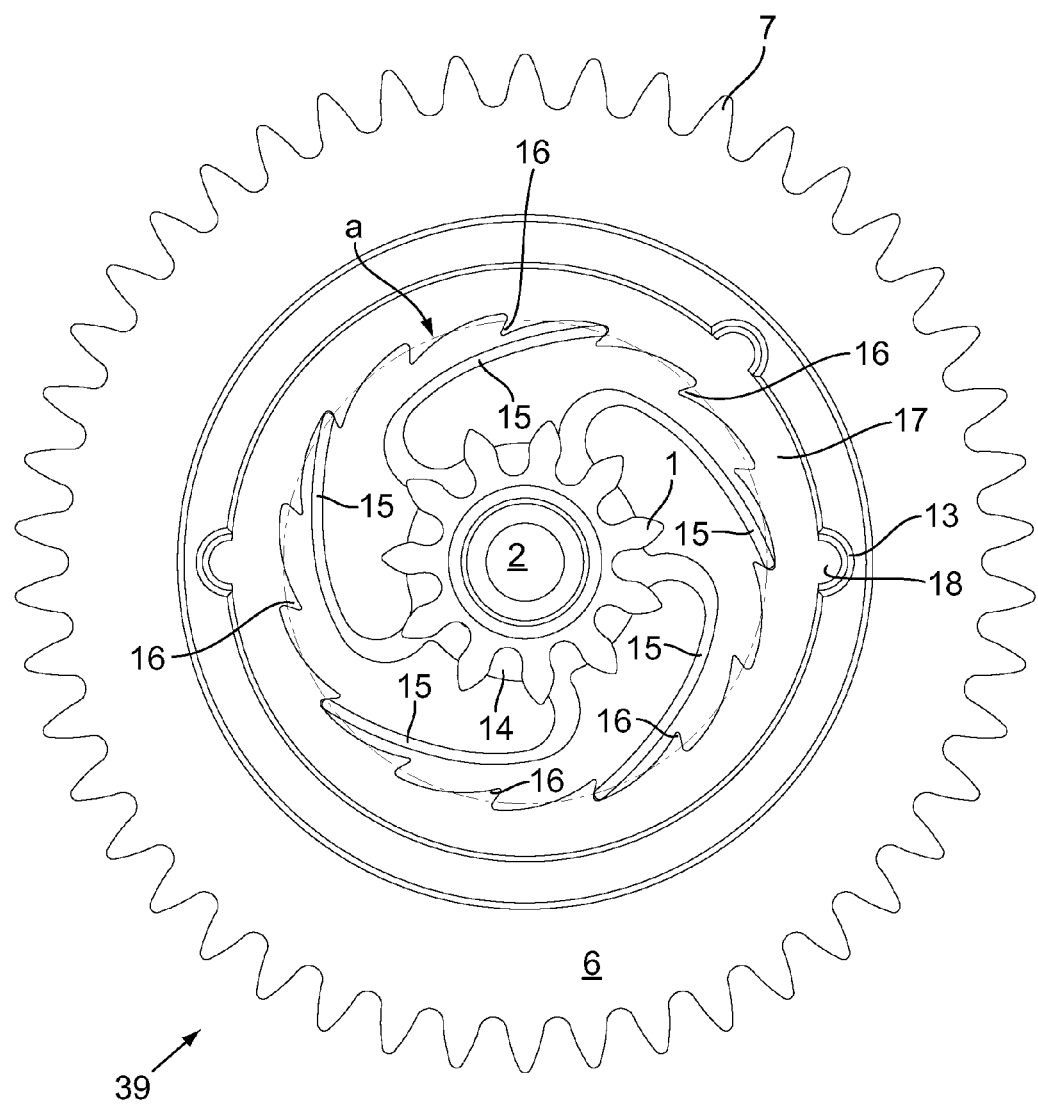
Figure 5:
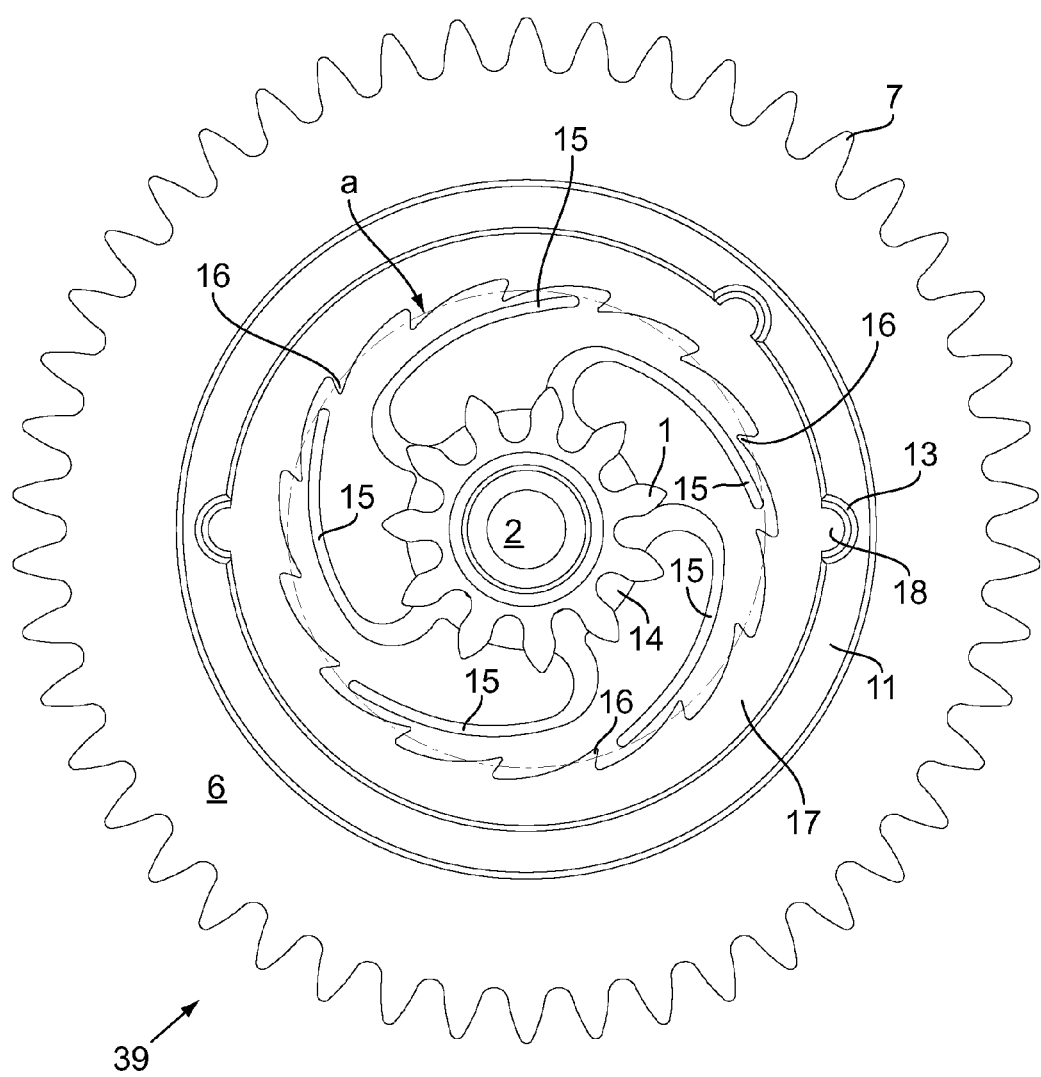
Figure 6:
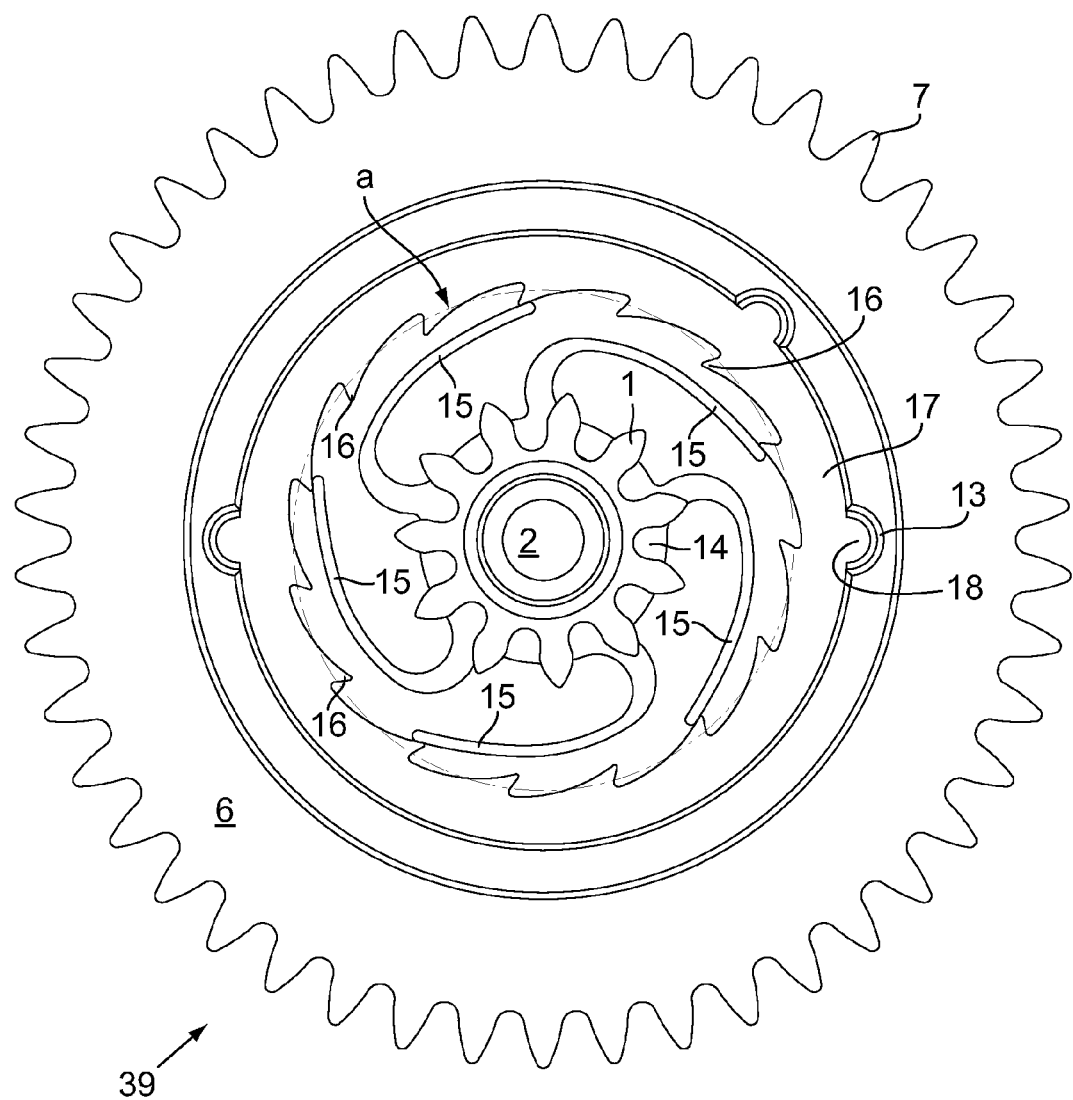

FIGS. 4, 5, and 6 are top plan views of the unidirectional coupling-clutch runner in three different positions.

Figure 7:
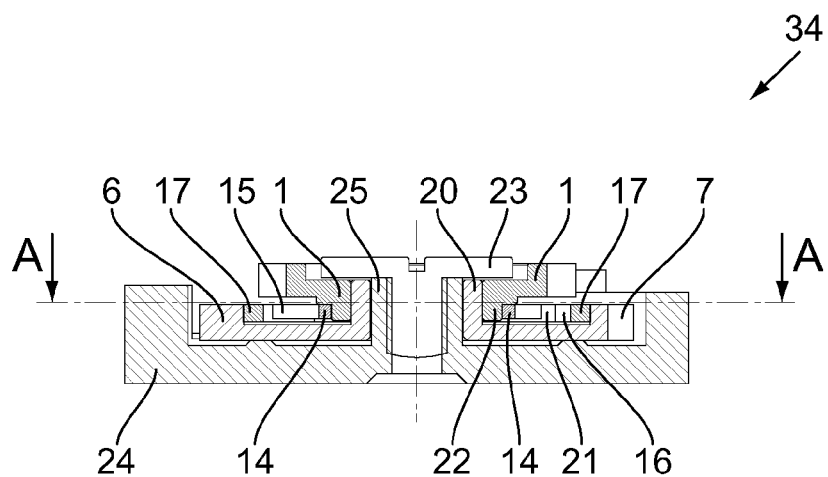

FIG. 7 is a view in section of a second embodiment of the coupling-clutch runner and its mounting on a bridge using a screw.

Figure 8:
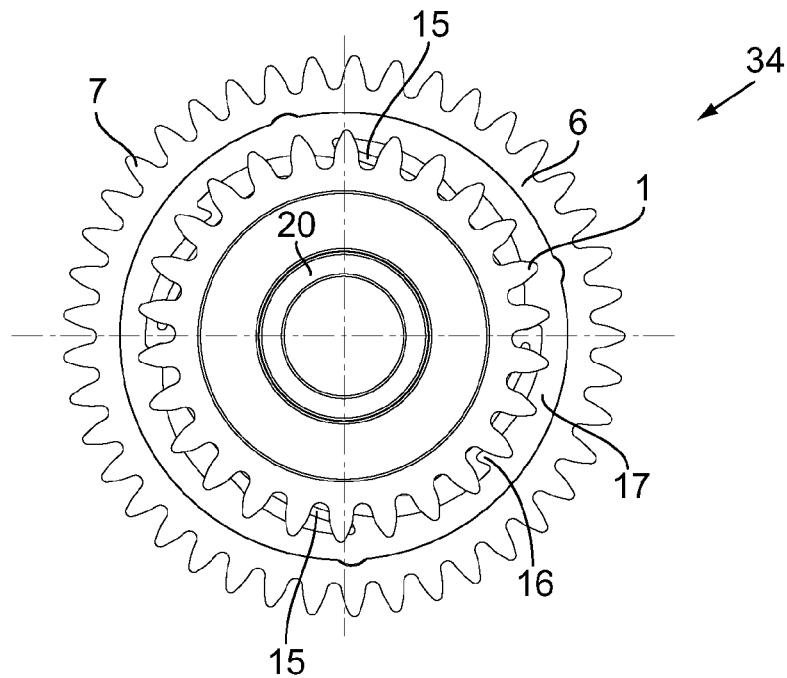

FIG. 8 shows in plan view the second embodiment of the coupling-clutch runner alone.

Figure 9:
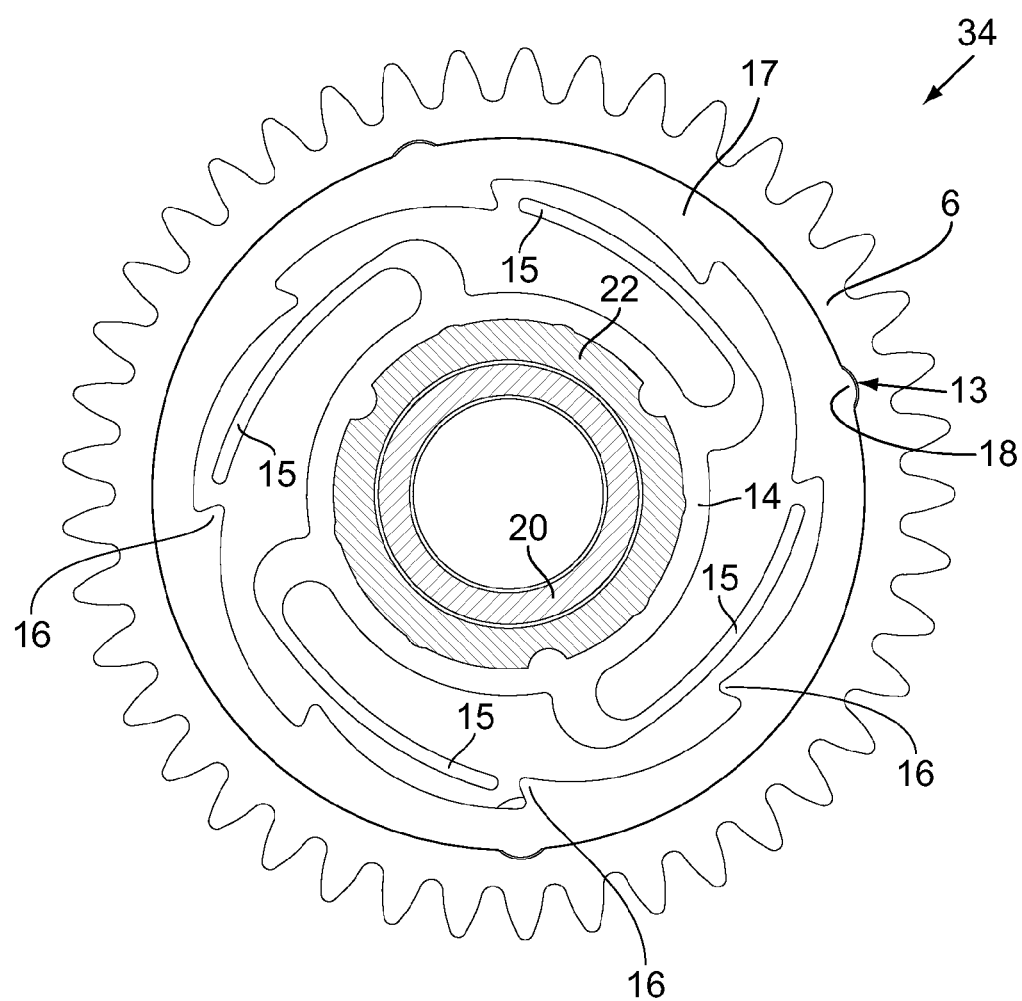

FIG. 9 is a section view along line A-A of FIG. 7, the bridge and fastening screw of the coupling-clutch runner being removed.

Figure 10:
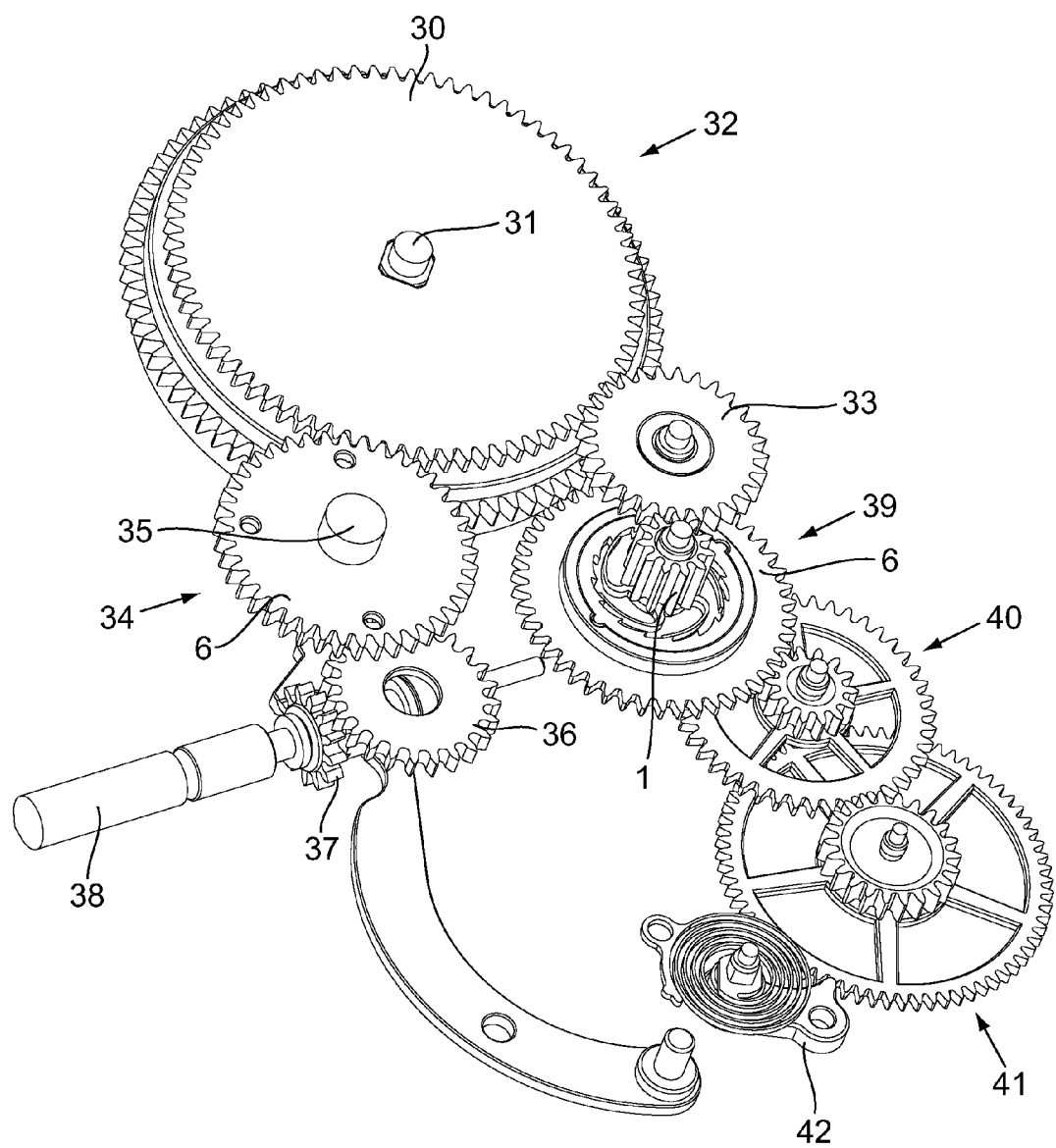

FIG. 10 schematically shows in perspective the manual and automatic winding mechanism of a watch movement comprising two unidirectional coupling-clutch runners according to the invention.

The unidirectional coupling-clutch runner according to the invention is designed mainly to outfit a watch movement, especially its winding mechanism, and not the dressing of a watch component. Actually, this unidirectional coupling-clutch runner must allow a very small overall height, less than 0.5 mm, typically with a thickness of 0.3 mm. It must moreover be able to transmit in one direction of rotation a considerable torque that can reach 1000 gr. mm, and even more, without damage. It must finally have a resistance torque in the opposite direction of rotation which is as small as possible, typically from 3 to 10 gr. mm. Such a coupling-clutch runner must therefore have a greatly increased ratio between its maximum transmission torque and its minimum resistance torque on the order of 1/200 to 1/400.

Another purpose of this invention is to produce a unidirectional coupling-clutch runner which makes it possible to reduce wear on its component parts.

On the other hand, this unidirectional coupling-clutch runner does not seek to reduce the dead zone, especially in an automatic winding mechanism. Nor is it designed to limit the transmission torque, but seeks to have a maximum transmitted torque in one direction and a minimum resistance torque in the other direction of rotation.

This being previously posed, a first embodiment of the unidirectional clutch-release runner according to the invention will be described below with reference to the FIGS. 1 to 6 of the attached drawing, FIG. 10 illustrating a particular use of this runner in the winding mechanism of a watch movement.

The illustrated unidirectional clutch-release runner comprises a pinion 1 which is integral with an axle 2. Generally this pinion 1 is made from a part fabricated with this axle 2. This axle 2 comprises, adjoining the end surface of the pinion 1, a first bearing surface 3 followed by a second bearing surface 4 of larger diameter, itself followed by a third bearing surface 5 with a diameter greater than that of the middle second bearing surface 4.

This unidirectional coupling-clutch runner also comprises a wheel 6 whose periphery has a toothing 7. This wheel 6 is loosely pivoted on the second bearing surface 4 of the axle 2 and its axial position relative to this axle 2 is assured on the one hand by the free front face of the first bearing surface 3 of the axle 2 and on the other hand by a washer 8 driven onto the third bearing surface 5 of the axle 2. This washer 8 is housed at least partially in a circular hollow 9 which presents the free front face 10 of the wheel 6 to reduce the overall height of the runner.

The wheel 6 comprises a hub 11 whose face opposite the hollow 9 is provided with a recess 12. This recess 12 is of a general cylindrical shape and comprises housings 13 made in its lateral surface.

The runner therefore comprises a pinion 1 that is integral with its axle 2 and a wheel 6 which is freely pivoted on a middle bearing surface 4 of this axle and which is kept axially on this axle by a washer 8 driven onto a third bearing surface 5 of said axle 2.

The unidirectional disengagement function of the runner is produced by a first driving part 14 that is angularly integral with the axle 2 and which comprises elastic catches 15 which work with an asymmetrical wolf-toothing 16 carried by the internal edge of a second annular driving part 17 that is angularly integral with the wheel 6.

The first driving part 14 has a central opening traversed by the first bearing surface 3 of the axle 2. This first bearing surface 3 can have a non-circular shape corresponding to the shape of the central opening of the first driving part 14 so that this first driving part is angularly integral with the axle 2.

In variants, this first driving part 14 could be driven, soldered or cemented to the first bearing surface 3 of the axle 2.

This first driving part in the illustrated example comprises five elastic catches 15 connected by their thick base to the central part of the first driving part 14 and extending toward the outside as they become thinner to form catches 15 which can be elastically deformed radially.

The second driving part 17 is annular and comprises on its inner wall an asymmetrical wolf-toothing 16. The outer edge of this second annular driving part comprises bosses 18.

This second annular driving part 17 is located in the recess 12 of the hub 11 of the wheel 6, the bosses 18 are housed in the housings 13 of this hub 11 to be angularly integral with the wheel 6 of this second driving part 17.

Therefore the two driving parts 14 and 17 are located in the recess 12 of the hub 11 of the wheel 6 and are coplanar.

In the resting state of the unidirectional coupling-clutch runner which is shown in FIG. 5, the ends of the elastic catches 15 are located on a circumference of diameter a, the catches not being elastically deformed at rest and being out of all contact with the second driving part 17. As shown in this FIG. 5, the tips of the teeth 16 of the second driving part 17 are located on a diameter which is smaller than the diameter of the circumference a and the hollows of these teeth 16 are located on a circumference of greater diameter than the circumference a which forms the enclosure of the first driving part 14 when it is not elastically deformed in the resting state. Therefore, in this resting state the driving parts 14 and 17 do not touch one another and the wheel 6 is free to move angularly relative to the pinion 1 without load. This is a significant characteristic of the unidirectional coupling-clutch runner because it allows easy and smooth mounting of the driving parts 14, 17 in one another and makes it possible to reduce the resistance torque when the wheel 6 is driven clockwise in the illustrated example, the catches 15 touching the teeth 16 only on an angular range from 60° to 180° or during roughly ½ to ⅙ of one complete revolution of the wheel 6 relative to the pinion 1.

Typically, in the illustrated example in which the first driving part 14 comprises five elastic catches 15 and or the second driving part 17 comprises fifteen teeth 16, the elastic catches 15 rub against the teeth 16 only on an angle of 8.5° by increments of 24° of rotation of the wheel 6 clockwise relative to the pinion 1. The friction and wear of these driving parts are therefore reduced accordingly.

FIG. 6 shows the relative position of the wheel 6 with respect to the pinion 1 for which the end of the elastic catches 15 is in contact with the tip of a tooth 16. As is apparent, the elastic catches 15 are elastically deformed, their ends being positioned on a circumference of a diameter less than the circumference a in order to be able to escape the teeth 16 during an additional rotation of the wheel 6 relative to the pinion 1 clockwise.

As shown in the drawings, the radial displacement toward the interior of the catches is minor and involves only little load so as to maximally reduce the resistance torque and wear of the driving parts when the wheel 6 is turning clockwise relative to the pinion 1 corresponding to the disengagement of the coupling-clutch runner.

On the other hand, counterclockwise rotation of the wheel 6 relative to the pinion 1 from the resting state shown in FIG. 5 causes the end of the elastic catches 15 to come into contact with the short straight surface of the teeth 16, the elastic catches deforming elastically toward the outside and abutting against the bottom of the toothing 16, causing the pinion 1 to be driven by the wheel 6. The coupling-clutch runner is engaged. The torque transmitted from the wheel 6 to the pinion 1 can be greatly increased because the elastic catches 15 are then working in compression in their tapered part. Typically the nominal driving torque for the illustrated coupling-clutch runner with five elastic catches 15 and fifteen teeth 16 can be on the order of 1000 gr. mm.

Tests have shown that for a coupling-clutch runner with five elastic catches 15 and fifteen teeth 16 the resistance torque, during rotation in the direction of disengagement, between the wheel 6 and the pinion 1 is on the order of 5 gr. mm, whereas the maximum or fracture torque of the elastic catches 15 during rotation in the direction of engagement between the wheel 6 and the pinion 1 is on the order of 1800 gr. mm. There is therefore a ratio of the maximum torque to a resistance torque of on the order of 1/360. According to the embodiments of the coupling-clutch runner and especially of the number of elastic catches 15 and of teeth 16, this ratio of the maximum torque to the resistance torque can vary between 1/200 and 1/500.

For example in one embodiment of the coupling-clutch runner comprising four elastic caches 15 and eight teeth 16, the ratio of the maximum torque to the resistance torque is 1/200.

In the illustrated embodiment comprising five elastic catches 15 and fifteen teeth 16, the outside diameter of the hub 11 of the wheel 6 is 3.2 mm and the height H of this hub is 0.32 mm, the size occupied by the unidirectional coupling-clutch system is therefore actually greatly reduced in spite of the increased value of the torque which can be transmitted since it requires a thickness on the order of 0.15 to 0.25 mm solely to house the two driving parts 14, 17.

A second embodiment of the unidirectional coupling-clutch runner will be described below with reference to FIGS. 7 to 9 of the drawing.

In this second embodiment the toothed wheel 6 interacts with the tubular hub 20, or originates from a fabricated part with this tubular hub.

The plate of this wheel 6 comprises an annular recess 21 which is designed to receive the driving parts 14, 17.

The pinion 1 comprises an annular skirt 22 and is freely pivoted on the hub 20 of the wheel 6.

In the recess 21 of the wheel 6, as in the recess 12 of the first embodiment, are placed the first driving part 14 which is angularly integral with the pinion 1 and the second driving part 17 which is angularly integral with the wheel 6. FIG. 7 shows the mounting of this coupling-clutch runner on a barrel bridge 24 using a fastening screw 23. The hub 20 of the wheel 6 is loosely pivoted on a central tubular part 25 of the barrel bridge 24 in the recess of which the fastening screw 23 is screwed.

In this second embodiment the first driving part 14 comprises four elastic catches 15 and the second driving part 17 comprises eight wolf-teeth 16.

The operation of this second embodiment is the same as that of the first embodiment with the sole difference that the angular amplitude of one increment is 45° and that for each increment the elastic catches 15 are in contact with the second driving part 17 only on an angular range of 11°.

The maximum fracture torque of this embodiment is greater than 1400 gr. mm and the minimum resistance torque is 7 gr. mm, which yields a ratio of more than 1/200.

In this embodiment the unidirectional coupling-clutch runner has exactly the same size as a corresponding runner which cannot disengage since the engagement system, i.e. the two driving parts 14, 17, are housed in the recess 21 made in the plate of the wheel 6.

As can be immediately realized if the direction of driving of the pinion by the wheel must be reversed, it is enough to turn over the two driving parts 14, 17.

In all possible embodiments of this unidirectional coupling-clutch runner the following advantages accrue:

1. Very small overall height because the engagement device is housed in a recess made in the plate of the runner.
2. Very easy mounting because it is enough to place the first and second driving parts 14, 17 in the recess of the wheel. This will be done very easily when the angular position of the wheel and of the pinion is such that the coupling-clutch runner is in its resting, neutral state, for which the elastic catches are not in contact with the second driving part.
3. The minimum resistance torque when the runner is turning in the direction of disengagement is very small because the elastic catches are in contact with the second driving part only during ½ or ⅙ of one complete revolution of the pinion relative to the wheel. Moreover, the C shape with a fine and elongated external branch of the elastic catches results in that a very weak force is sufficient when they must be radially refracted for passage of the teeth. Moreover this torque is not constant and is exerted only while the elastic catches are in contact with the second driving part.
4. Since the elastic catches are not continually in contact with the second driving part, the wear on the elastic catches and the wolf-teeth of the second driving part is greatly reduced.
5. Still as a result of the shape of the elastic catches the transmitted torque, when the runner is operating in engagement, is raised because the catches are working in compression and their bent base connecting them to the first driving part is thick and very resistant.

The major characteristics of the unidirectional coupling-clutch runner according to the invention are as follows:

a) The C shape with one external elongated and tapered branch of the elastic catches to allow them to be elastically deformed radially under the action of a weak force. The base connecting these elastic catches to the first driving part being thick and resistant makes it possible to transmit a significant torque.

b) The fact that for one complete revolution of the pinion relative to the wheel in the direction of disengagement the elastic catches that are in contact with the wolf-toothing at most for 180° will therefore reduce the wear on the parts and the resistance torque.

c) That the first and second driving parts 14, 17 are housed in a recess made in the plate of the wheel, which greatly reduces the overall height of the unidirectional coupling-clutch runner.

d) The end of the elastic catches in the resting state, when they are not in contact with the toothing of the second driving part, is located on a circumference of a greater diameter than the circumference going through the tip of the teeth 16 of the second driving part and smaller than the circumference going through the bottoms of said toothing.

e) The ratio of the resistance torque when the runner is disengaging relative to the maximum fracture torque, when the runner is engaging, is between 1/200 and 1/800.

The resistance torque is less than 20 gr. mm, preferably from 5 to 15 gr. mm.

The fracture torque is greater than 1000 gr. mm, preferably between 1300 gr. mm and 1800 gr. mm.

f) The number of elastic catches is for example between 1 and 12, preferably between 3 and 8 and the number of wolf-teeth is for example between 3 and 60.

The described disengagement runner or coupling-clutch runner is designed more particularly to outfit or to be used in applications and mechanisms being part of watch movements. By way of example FIG. 10 illustrates a particular application of coupling-clutch runners according to the invention in an automatic winding watch movement.

In this example, the barrel ratchet 30 mounted on the axle 31 of a barrel 32 is engaged on the one hand with an automatic intermediate ratchet 33 and on the other hand with an intermediate winding ratchet 34.

The intermediate winding ratchet 34 here is composed of a coupling-clutch runner according to the second embodiment described above. The hub 22 of the wheel 6 is pivoted on an axle 35 and this wheel 6 is engaged with the ratchet 30. The pinion 1 of this coupling-clutch runner is engaged with a crown wheel 36 driven by a winding pinion 37 which is angularly integral with the winding stem 38 of the watch movement.

Therefore, when the user turns the winding crown of his watch clockwise, by way of the crown wheel 36 he drives the pinion 1 and the wheel 6 of the intermediate winding ratchet 34 clockwise and ultimately the barrel ratchet 30 counterclockwise.

On the other hand, when the barrel ratchet 30 is driven, as will be seen below, by the automatic winding wheel, the intermediate winding ratchet 34 disengages and does not drive the crown wheel 36.

The automatic intermediate ratchet 33 is engaged with the pinion of a ratchet driving runner 39 whose wheel meshes with the pinion of a reducing runner 40 whose wheel is engaged with the pinion of a tension wheel 41 that works with a spring locking catch 42 and is driven by an automatic winding mass (not shown).

In this kinematic automatic winding linkage, the ratchet driving wheel 39 is formed by a clutch-release runner or coupling-clutch runner according to the first embodiment described above. The pinion 1 of this coupling-clutch runner is engaged with the automatic intermediate ratchet 33 and the wheel 6 of this coupling-clutch runner is engaged with the pinion of the reducing wheel 40.

When the tension wheel 41 is driven counterclockwise by the automatic winding mass, the wheel 1 of the coupling-clutch runner which forms the ratchet driving wheel 39 turns counterclockwise, likewise driving the pinion 1 of this runner counterclockwise and therefore the barrel ratchet 30 also counterclockwise by way of the automatic intermediate ratchet 33.

On the other hand, when the automatic intermediate ratchet 33 is driven by the barrel ratchet during manual winding, the pinion 1 of the coupling-clutch runner 39 is driven clockwise and the wheel 6 of this coupling-clutch runner is not driven.

Therefore, due to the use of two coupling-clutch runners 34, 39, during manual winding, the driving of the reducing wheel 40 and of the tension wheel 41 is avoided, therefore sparing the wear on its toothing and its catch 42. During automatic winding of the barrel 32 the coupling-clutch runner 34 disengages and the crown wheel is not driven.

Such a winding mechanism of an automatic watch movement comprising a moving clutch-release runner or coupling-clutch runner between the crown wheel and the barrel ratchet and a second moving clutch-release runner or coupling-clutch runner in the kinematic linkage between the barrel ratchet and the tension wheel makes it possible to significantly reduce the wear on the winding mechanism and to improve its winding speed.

The invention claimed is:

1. Unidirectional coupling-clutch runner comprising a coaxial pinion (1) and wheel (6) which pivot relative to one another, characterized by the fact that it comprises a first driving part (14) that is angularly integral with the pinion (1) comprising at least one elastic catch (15) with the general shape, in plan view, of a C, one branch of which is elongated and terminates with a free end; that it also comprises a second driving part (17) that is angularly integral with the wheel (6) and that is coplanar with the first driving part (14) comprising an internal wolf-toothing (16); and by the fact that in the neutral rest position the first and second driving parts (14, 17) do not touch one another, the end of the elastic catches (15) in the rest position which are not elastically deformed being located on a circumference (a) whose diameter is larger than a circumference which goes through the top of the wolf-teeth (16) and smaller than a circumference going through the bottom of the teeth (16) of the second driving part.

2. Runner according to claim 1, wherein the first (14) and second (17) driving parts are coaxial, coplanar and located in a recess (12, 21) that the wheel (6) comprises.

3. Runner according to claim 1, wherein the first driving part (14) comprises a central portion originating from a part fabricated with the elastic catches (15).

4. Runner according to claim 1, wherein the second driving part (17) is a crown comprising an internal wolf-toothing (16).

5. Runner according to claim 1, wherein during a rotation of the pinion (1) relative to the wheel (6) in the direction corresponding to disengagement of the runner, the free end of the elastic catches (15) comes in contact with the second driving part (17) and are deformed radially toward the interior over at most 180° for one complete revolution of the pinion (1) relative to the wheel (6).

6. Runner according to claim 5, wherein during a rotation of the pinion (1) relative to the wheel (6) in the direction corresponding to engagement of the runner, the free end of the elastic catches comes into contact with the teeth (16) of the second driving part and are deformed elastically toward the outside to press into the bottom of the toothing of the second driving piece, allowing the driving of the wheel (6) by the pinion (1) or vice versa.

7. Runner according to claim 1, wherein the pinion (1) is integral with or is made from a part fabricated with an axle (2), the first driving part (14) being angularly integral with this axle (2); and wherein the wheel (6) is pivoted on said axle (2).

8. Runner according to claim 1, wherein the wheel (6) comprises a central hub (20) acting as a pivot to the pinion (1) which comprises a skirt (22) driving the first driving part (14) in rotation; and wherein the plate of the wheel (6) comprises a recess (21) in which the two driving parts (14, 17) are located.

9. Runner according to claim 7, wherein a washer (8) is driven onto the axle (2) and maintains the relative axial position of the pinion (1) relative to the wheel (6).

10. Winding mechanism of a watch component comprising at least one unidirectional coupling-clutch-release runner according to claim 1.

11. Runner according to claim 2, wherein the first driving part (14) comprises a central portion originating from a part fabricated with the elastic catches (15).

12. Runner according to claim 2, wherein the second driving part (17) is a crown comprising an internal wolf-toothing (16).

13. Runner according to claim 2, wherein during a rotation of the pinion (1) relative to the wheel (6) in the direction corresponding to disengagement of the runner, the free end of the elastic catches (15) comes in contact with the second driving part (17) and are deformed radially toward the interior over at most 180° for one complete revolution of the pinion (1) relative to the wheel (6).

14. Runner according to claim 2, wherein the pinion (1) is integral with or is made from a part fabricated with an axle (2), the first driving part (14) being angularly integral with this axle (2); and wherein the wheel (6) is pivoted on said axle (2).

15. Runner according to claim 2, wherein the wheel (6) comprises a central hub (20) acting as a pivot to the pinion (1) which comprises a skirt (22) driving the first driving part (14) in rotation; and wherein the plate of the wheel (6) comprises a recess (21) in which the two driving parts (14, 17) are located.

* * * * *